INVENTORS
G. SOTEROPULOS
D. E. BURROUGH
R. H. FAIRBANK

United States Patent Office 3,485,020
Patented Dec. 23, 1969

3,485,020
HEADER CONTROL MEANS FOR A HARVESTER
Gust Soteropulos, Donald E. Burrough, and Raymond Harry Fairbank, Ottumwa, Iowa, assignors to Deere & Company, Moline, Ill., a corporation of Delaware
Filed June 26, 1967, Ser. No. 648,926
Int. Cl. A01d 75/14
U.S. Cl. 56—212                                                                 8 Claims

ABSTRACT OF THE DISCLOSURE

A windrower-type harvester having a forwardly disposed transversely elongated header mounted for independent vertical adjustment of either end of the header or of both ends in unison by means of independent hydraulic cylinders selectively actuated separately or in unison through a single foot-operated control mechanism.

BACKGROUND OF THE INVENTION

This invention relates to improved means for controlling the position of a harvesting platform or header mounted for vertical adjustment on a self-propelled harvesting machine such as a windrower or the like.

Such harvesting machines conventionally include a traction unit having an operator's station thereon and carrying a forwardly disposed transversely elongated harvesting platform or header. The header typically includes a transversely elongated cutting mechanism and a transverse conveyor rearwardly of the cutting mechanism for receiving the cut crop from the cutting mechanism and converging it toward the center of the machine. Such harvesting platforms are conventionally mounted for vertical adjustment on the traction unit, so that the platform may be raised for transport of the machine and the height at which the crop is cut may be varied. Such platforms are also conventionally vertically swingable from their operating position upon striking an obstruction or ground irregularity to protect the platform components when it is operated close to the ground, counterbalance springs generally being provided to substantially counterbalance the weight of the platform, facilitating the raising of the platform when it strikes an obstruction.

In U.S. patent application Ser. No. 604,870, filed December 27, 1966 and assigned to the assignee herein, means are disclosed for mounting the platform on the traction unit to permit independent vertical adjustment of the opposite ends of the platform, whereby either end of the platform is vertically swingable independently of the other end upon striking an obstruction, or either end of the platform is independently positionable so that the platform can be operated at a tilt about a fore-and-aft axis. As described in said application, the positions of the opposite ends of the platform are controlled by separate independently actuatable hydraulic cylinders.

SUMMARY OF THE INVENTION

According to the present invention, an integrated control system is provided for selectively actuating either or both of the hydraulic cylinders, which control the opposite ends of the platform, for independent vertical adjustment of the opposite ends of the platform, or for joint actuation of the hydraulic cylinders for movement on the opposite ends of the platform in unison. More specifically, the present invention provides a pedal-type mechanism at the operator's station on the traction unit actuatable by one foot of the operator for raising or lowering either end of the platform independently of the other end, or vertical adjustment of both ends of the platform in unison. Another feature of the invention resides in its simple, rugged construction and in its simplicity of actuation by the operator, permitting the operator to fully control the platform with one foot without distracting his attention during the operation of the machine.

DESCRIPTION OF THE PREFERRED EMBODIMENT

Figure 1:
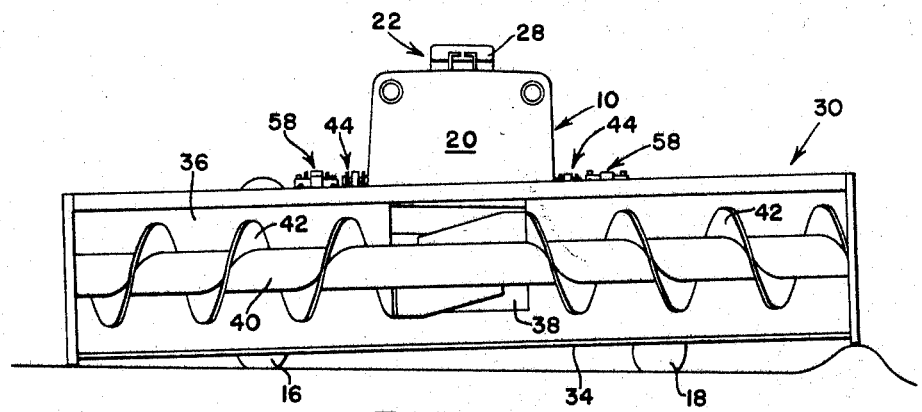
FIG. 1 is a front elevation of a typical windrower embodying the invention and showing the platform in a tilted condition.

The harvesting machine chosen to illustrate the invention is a windrower, which includes a main frame or body 10 having a forward transverse beam or frame member 12. Wheel support structures 14 are mounted at the opposite ends of the beam 12 and journal right and left traction wheels 16 and 18 respectively. The terms "right" and "left" are with reference to a person facing in the direction of machine travel (to the right in FIG. 2), and it is to be understood that such terms, as well as terms such as "upwardly," "downwardly," "forward," "rearward" etc., are terms of convenience used to more clearly describe the invention and not as limitations.

The body includes a generally upright front panel 20 extending between upright side panels 21. An operator's station 22 is mounted on the forward portion of the body, rearwardly of the front panel 20 and between the side panels 21, the operator's station including a generally horizontal floor 24 having an upwardly and forwardly inclined forward portion 26, and a seat 28 mounted above the floor. The operator's station is of conventional construction and only the forward portion of the floor is illustrated in the drawings.

The main frame or body carries a forwardly disposed, transversely elongated platform or header 30 having a generally horizontal bottom 32 which conventionally supports a transversely elongated cutting mechanism along its leading edge 34. The rear portion of the bottom 32 is curved upwardly and converges with a generally upright rear wall 36 having a rearward central opening 38. The converging bottom and rear wall form an arcuate auger trough in which a transverse auger 40 rotates, the auger 40 having oppositely wound flights 42 at its opposite ends to converge the crop to the center of the platform from where it is discharged rearwardly through the opening 38.

Figure 2:
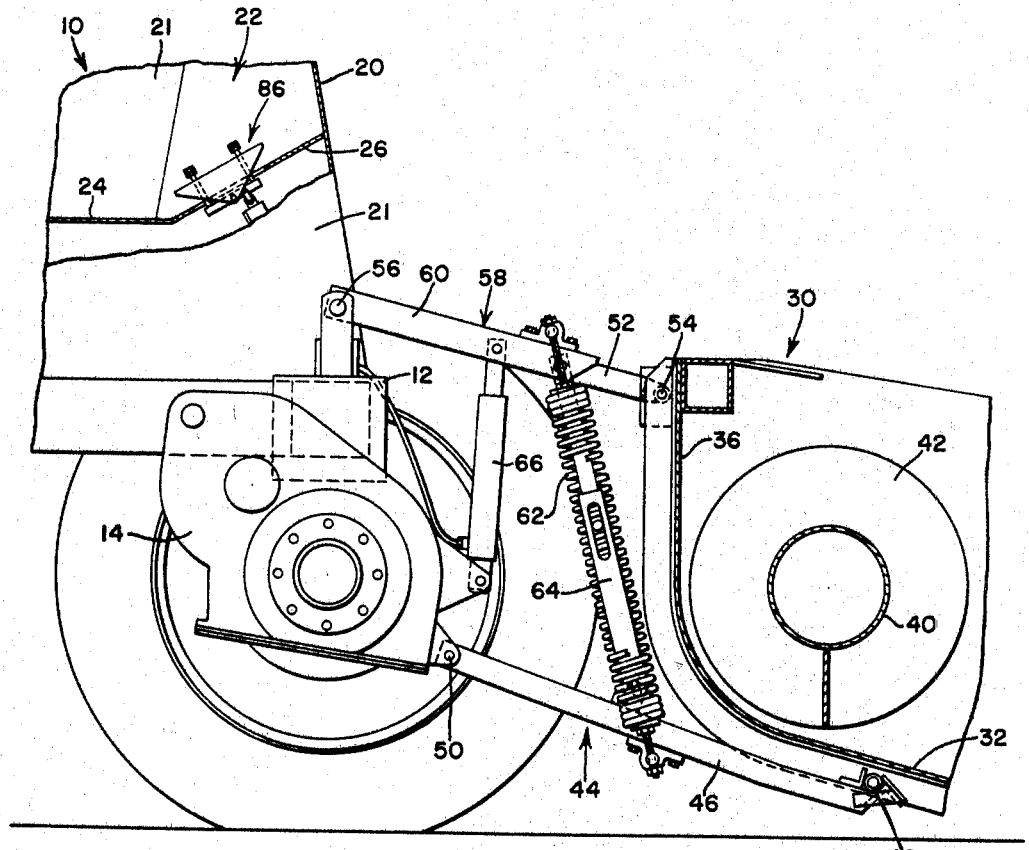
FIG. 2 is an enlarged fragmentary side elevation, partly in section, showing the means for mounting the platform on the traction unit and the pedal control therefor.

The harvesting platform or header 30 is mounted for generally vertical adjustment relative to the main frame 10 on a pair of parallel-type mounting mechanisms, indicated in their entirety by the numeral 44, the mounting mechanisms being laterally spaced and respectively extending between the opposite sides of the main frame 10 and the opposite end portions of the platform 30. The mounting mechanisms 44 are identical, so only the right side mounting mechanism, which is illustrated in FIG. 2, will be described. The mounting mechanism includes a generally fore-and-aft lower link 46 pivotally connected at its forward end to the bottom of the platform at 48 and pivotally connected at its rearward end to the wheel supporting structure 14 at 50. The mechanism also includes a generally fore-and-aft upper link 52, which is substantially parallel to the lower link 46 and connected to the upper end of the platform at 54 and connected to the main frame on a pivot 56 at its rearward end. The pivot connections of the links 46 and 52 have sufficient play to permit a substantial degree of movement of one mounting mechanism independent of the other, so that the opposite ends of the platform are independently vertically adjustable.

Associated with the respective mounting mechanisms 44 is a pair of adjusting mechanisms 58, only one of which will be described herein since, like the mechanisms 44, they are identical. The right-hand mechanism 58 includes a generally fore-and-aft lift arm 60, which is generally parallel to and on the same horizontal plane as the upper link 52 and is pivotally connected at its rearward end to the frame 10 on the same pivot means 56 as the link 52. The forward end of the lift arm 60 is connected to the central portion of the lower link 46 by a pair of parallel, generally upright, helical tension springs 62 which deflect under the weight of the platform and exert an upward force on the lower link 46 which at least partially counterbalances the weight of the platform. A lost-motion member 64 also extends between the forward end of the lift arm 60 and the middle of the lower link 46, parallel to the springs 62, the lost-motion member limiting the extension and compression of the springs 62 so that the platform 30 is vertically adjustable on the mounting mechanism 44 only to a limited extent for any given position of the lift arm 60.

The position of the lift arm 60 in the right-hand adjusting mechanism 58 is established by the right-hand lift cylinder 66 pivotally connected at its lower end to the wheel support structure 14 and at its upper end to the lift arm 60 intermediate its opposite ends. Similarly, the position of the lift arm 60 in the left-hand adjusting mechanism is established by a left-hand lift cylinder 68 extending between the left-hand wheel support structure 14 and the left-hand lift arm 60.

The extension of the cylinders 66 and 68 is controlled by a hydraulic control system which includes a pair of engine-driven hydraulic pumps P having an associated reservoir. The pressurization or exhaust of the right-hand cylinder 66 is controlled by a right-hand control valve 70, connected to one pump by a line 72, to the cylinder by a line 74, and to the reservoir by a line 76, the valve 70 porting pressurized fluid to the cylinder 66 via the lines 72 and 74 when shifted in one direction and dumping the cylinder 66 via the lines 74 and 76 when shifted in the other direction. Similarly, a right-hand control valve 78, connected to the other pump by a line 80, to the cylinder by a line 82, and to the reservoir by a line 84, pressurizes or exhausts the cylinder 68 when shifted in opposite directions.

The right and left control valves 70 and 78 respectively are independently or jointly actuated by the operator by means of a pedal-type valve actuating mechanism, indicated in its entirety by the numeral 86. The mechanism includes lever-like right-hand and left-hand control members 88 and 90, respectively rockably mounted on a transverse pivot 92, which is supported adjacent to and below the forward portion of the operator's station floor 26 on a pair of depending brackets 94. The members 88 and 90 are generally parallel and are transversely spaced by a sleeve-type spacer 96 on the pivot 92, the members 88 and 90 both being swingable about their approximate centers on the pivot 92. The right-hand control member 88 is adjacent to the right-hand valve 70 and is pivotally connected to the valve member or spool 99 by a relatively short link 98, connected to the member 88 forwardly of the pivot 92. Similarly, a valve member or spool 101 of the left-hand control valve 78 is connected to and actuated by the left-hand control member 90 through a link 100, which is pivotally connected to the member 90 forwardly of the pivot 92.

Projecting upwardly at right angles from the forward end of the member 88 is a post 102, while a similar post 104 projects upwardly from the rear end of the member 88. The posts 102 and 104 are threaded at their upper ends which respectively accommodate nut-like knobs 106 and 108, the upper surfaces of the knobs being engageable by the foot of the operator. Similarly, posts 110 and 112 respectively project upwardly at right angles from the forward and rearward ends of the left-hand member 90 and carry knobs 114 and 116 respectively at their upper ends. The four posts extend upwardly through a hole 118 in the forward floor portion 26, the upper foot-receiving surfaces of the knobs on the posts being substantially above the level of the floor portion 26.

A treadle-type member or pedal 120 overlies the control members 88 and 90 and includes a relatively flat, foot-receiving surface 122, normally parallel to and above the floor portion 26, and inverted, generally triangular right and left side portions 124 and 126 respectively depending from the opposite sides of the upper foot-receiving surface 122 and pivotally mounted on the pivot 92 at their vertices respectively adjacent to the members 88 and 90. The upper, foot-receiving portion 122 of the pedal 120 has four fore-and-aft elongated apertures 128 respectively adaptable to slidably receive the posts 102, 104, 110, and 112, which project upwardly through the apertures. The apertures 128 have a lesser width than the knobs on top of the posts, and since the pedal 120 is mounted on the same pivot as the members 88 and 90, relative rocking movement between the pedal 120 and the members 88 and 90 is limited by the upper surface 122 engaging the undersides of the knobs.

In operation, when the platform 30 is operated in a level condition, the cylinders 66 and 68 are extended the same amount, whereby both adjusting mechanisms 58 and the mounting mechanisms 44 controlled thereby are in identical positions. If the platform is being operated along the ground, the cylinders 66 and 68 are normally retracted to a position wherein the lost-motion members 64 permit either upward or downward movement of the platform, as shown in FIG. 2. In this position, either end of the platform is free to raise upon striking an obstruction, or lower to follow the contour of the ground, independently of the opposite end.

To raise or lower the platform in a level condition, the operator places his foot on the foot-receiving surface 122 of the pedal 120. Depression of the forward portion of the pedal will cause the pedal to rock forwardly about the pivot 92 (clockwise in FIG. 3). After a small amount of such clockwise movement, the surface 122 will engage the undersides of the knobs 108 and 116 on the posts 104 and 112 respectively, so that additional rocking of the pedal 120 will raise the posts 104 and 112, causing simultaneous rocking of the members 88 and 90 about the pivot 92 (clockwise in FIG. 3). As is apparent from the drawings, this movement of the control members axially shifts the members 99 and 101 of the right and left control valves respectively, so that both cylinders 66 and 68 are dumped to the reservoir, whereby the platform 30 is permitted to lower.

Figure 3:
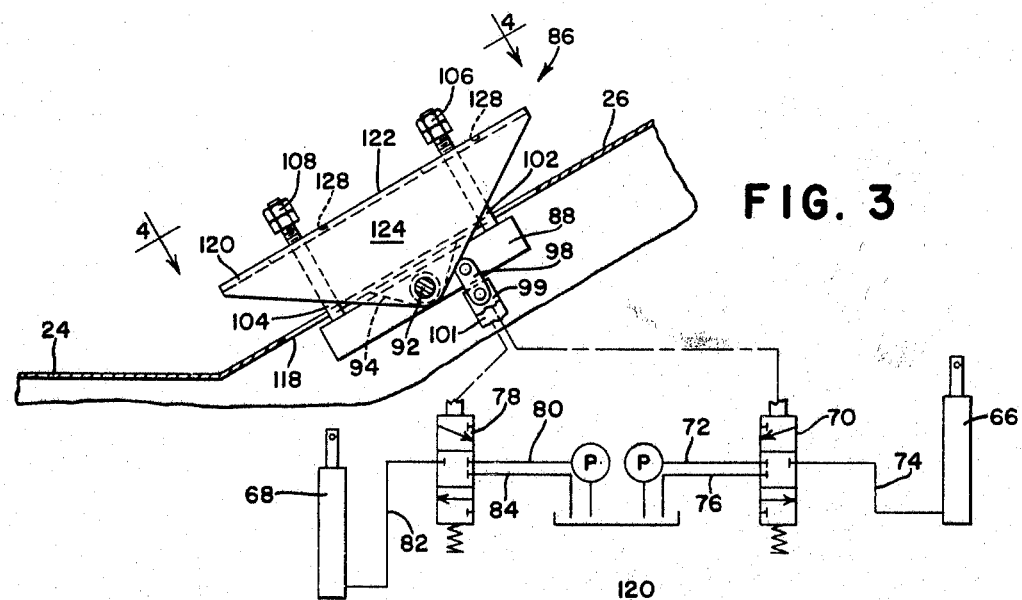
FIG. 3 is an enlarged view of the pedal control shown in FIG. 2, schematically showing the hydraulic platform control system.
Figure 4:
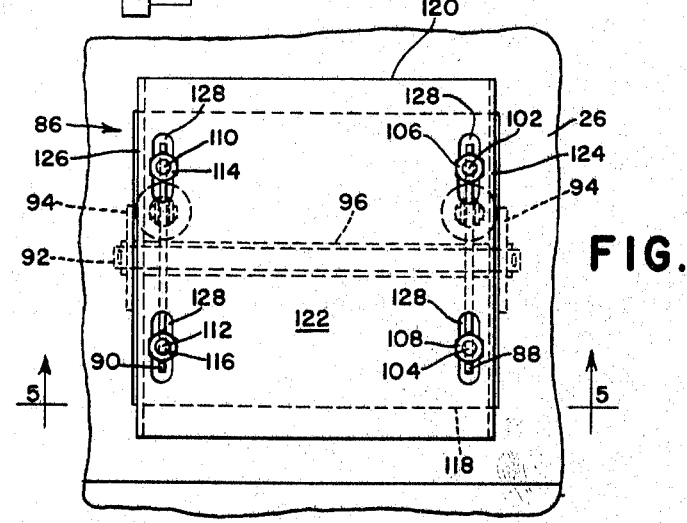
FIG. 4 is a plan view of the control pedal as viewed along the line 4—4 of FIG. 3.
Figure 5:
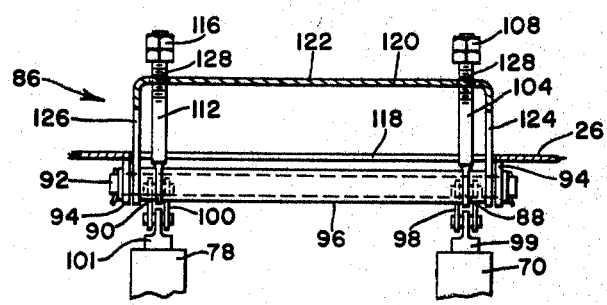
FIG. 5 is an end view of the control pedal as viewed along the line 5—5 of FIG. 4.

When the operator releases foot pressure from the pedal 120, the spring loaded valves 70 and 78 return to their neutral condition as shown in FIG. 3, also returning the members 88, 90 to their neutral position. Conversely, to raise both sides of the platform in unison, the rearward portion of the pedal surface 122 is depressed, so that the pedal is rotated in a counterclockwise direction, and after the pedal engages the underside of the knobs 106 and 114 on the posts 102 and 110 respectively, additional rocking movement of the pedal 120 causes the members 88 and 90 to rotate in a counterclockwise direction, raising the valve members 99 and 101 simultaneously, so that pressure is ported to both cylinders 66 and 68, raising both ends of the platform in unison.

If it is desired to operate the platform in a tilted condition, such as along an irrigation border, as shown in FIG. 1, the opposite ends of the platform can be independently raised or lowered by depression of one of the four knobs located above the pedal surface 122. For example, if it is desired to raise the right side of the platform independently of the left side, the lower right-hand knob 108 on the post 104 is depressed, rocking only the right-hand control member 88 in a counter-clockwise direction, so that only the right-hand control valve 70 is actuated to pressurize only the right-hand lift cylinder 66, which, of course, raises only the right-hand side of the platform. Conversely, to lower the right-hand side of the platform only, the upper right-hand knob 106 on the post 102 is depressed, rocking the member 88 only in a clockwise direction, to shift the valve 70 to its dump position, permitting the retraction of the cylinder 66. Similar manipulation of the knobs 114 and 116 on the left-hand side of the pedal will cause separate actuation of the left-hand control valve 78 and the left-hand cylinder controlled thereby.

It can be appreciated that the operator would normally maintain his foot on the treadle-type pedal 120 and could effortlessly control the vertical adjustment of the platform thereby without the use of his hands or taking his eyes away from the direction of travel. It can also be appreciated that the individual knobs can easily be actuated for independent control of the opposite ends of the platform without special attention from the operator, since the knobs are widely separated and can be easily located by the foot of the operator without substantially shifting his foot.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a self-propelled harvester having a main body with an operator's station thereon, a forwardly disposed transversely elongated header, means for mounting the header on the body for vertical adjustment thereon, the opposite end portions of the header being vertically adjustable independently or in unison, and first and second independently actuated hydraulic cylinders, the extension of which respectively establishes the vertical adjustment of the opposite end portions of the header, the improvement residing in means for controlling the extension of the hydraulic cylinder comprising: a source of fluid pressure; first and second control valve means respectively connected to the first and second hydraulic cylinders and the fluid pressure source and operative to control the extension of the cylinders; and a manually actuatable control mechanism mounted on the body at the operator's station and operatively connected to the control valve means for actuating the valve means separately or in unison, the control mechanism including first and second control members respectively connected to the first and second control valve means and independently manually actuatable for separate actuation of the first and second control valve means, and a third control member operatively associated with the control valve means and manually actuatable for actuation of the first and second control valve means in unison.

2. The invention defined in claim 1 wherein the third control member is operatively engageable with the first and second control members when it is actuated to actuate said first and second members in unison.

3. The invention defined in claim 1 wherein the operator's station includes a floor and the control mechanism is mounted at the operator's station adjacent the floor for foot actuation by the operator.

4. The invention defined in claim 3 wherein the control members are pivotally mounted on the body and are actuated by rocking movement about their axes in either direction, wherein rocking movement of the control members in one direction actuates the valve means for extension of the respective cylinders and rocking of said members in the opposite direction actuates the valve means to retract the respective cylinders.

5. The invention defined in claim 4 wherein the control member pivots are coaxial and transverse to the direction of machine travel.

6. The invention defined in claim 5 wherein the first and second control members each include a lever arm rockable on a transverse pivot, and a pair of parallel post members projecting upwardly from the lever arm, offset from and on opposite sides of the pivot, each post member having an upper foot-receiving surface, whereby depression of the foot-receiving surface of one of the post members causes rocking of the control member in one direction and depression of the foot-receiving surface of the other post member causes rocking of the control member in the opposite direction.

7. The invention defined in claim 6 wherein the third control member includes a relatively large foot-receiving surface overlying the lever arms of the first and second control members and having a plurality of apertures adaptable to slidably receive the post members of the first and second control members.

8. The invention defined in claim 7 wherein each post member includes a top means operatively engageable with the third control member to limit the sliding movement of the post members through said apertures and thereby limit the relative rocking movement between the third control member and the first and second control member, the third control member operatively engaging a stop means on both the first and second control means after a predetermined amount of movement for joint actuation of the control members.

References Cited

UNITED STATES PATENTS

| | | | |
|---|---|---|---|
| 2,636,290 | 4/1953 | Bell | 91—414 X |
| 3,137,984 | 6/1964 | Shonkwiler | 56—214 |
| 3,264,808 | 8/1966 | Hagan | 56—214 |

RUSSELL R. KINSEY, Primary Examiner

ROBERT F. CUTTING, Assistant Examiner

U.S. Cl. X.R.

56—217